US008625782B2

(12) United States Patent
Rane et al.

(10) Patent No.: US 8,625,782 B2
(45) Date of Patent: Jan. 7, 2014

(54) METHOD FOR PRIVACY-PRESERVING COMPUTATION OF EDIT DISTANCE OF SYMBOL SEQUENCES

(75) Inventors: Shantanu Rane, Cambridge, MA (US); Wei Sun, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 908 days.

(21) Appl. No.: 12/703,150

(22) Filed: Feb. 9, 2010

(65) Prior Publication Data

US 2011/0194691 A1  Aug. 11, 2011

(51) Int. Cl.
  *H04L 9/00* (2006.01)

(52) U.S. Cl.
  USPC ............................................. 380/28; 708/422

(58) Field of Classification Search
  USPC ........ 380/267, 42, 282, 285, 28, 30; 708/100, 708/200–201, 207–209, 230–232, 236, 250, 708/422–424
  See application file for complete search history.

(56) References Cited

U.S. PATENT DOCUMENTS

| | | | |
|---|---|---|---|
| 5,757,959 A * | 5/1998 | Lopresti | 382/186 |
| 7,107,524 B2 * | 9/2006 | Lin et al. | 715/234 |
| 7,856,100 B2 * | 12/2010 | Wang et al. | 380/30 |
| 7,860,244 B2 * | 12/2010 | Kerschbaum | 380/30 |
| 8,130,947 B2 * | 3/2012 | Kerschbaum et al. | 380/28 |
| 8,271,796 B2 * | 9/2012 | Diamond | 713/180 |
| 2006/0245587 A1 * | 11/2006 | Pinkas et al. | 380/28 |
| 2009/0313463 A1 * | 12/2009 | Pang et al. | 713/150 |
| 2011/0154016 A1 * | 6/2011 | Niccolini et al. | 713/150 |

OTHER PUBLICATIONS

Atallah et al, "Secure and Private Sequence Comparisons" [Online], Oct. 30, 2003 [Retrieved on: Oct. 18, 2010], WPES '03: Proceedings of the 2003 ACM workshop on privacy in the electronic society, pp. 39-44, ACM Press [Retrieved from: http://www.cis.syr.edu/~wedu/Research/paper/wpes03.pdf].*

Ravikumar et al, "A Secure Protocol for computing String Distance Metrics" [Online], Workshop on Privacy, Security and Data Mining 2004 (at ICDM 2004) [Retrieved on: Oct. 19, 2012], ACM [www.acm.org], [Retreived from: http://www.cs.cmu.edu/~wcohen/post-script/psdm-2004.pdf].*

Scannapieco et al, "Privacy Preserving Schema and Data Matching" [Online], Jun. 12-14, 2007 [ Retrieved on: Oct. 19, 2012], ACM [www.acm.org], SIGMOD 2007 [ Retrieved from: http://delivery.acm.org/10.1145/1250000/1247553/p653-scannapieco.pdf].*

(Continued)

*Primary Examiner* — April Y Blair
*Assistant Examiner* — Eric W Shepperd
(74) *Attorney, Agent, or Firm* — Dirk Brinkman; Gene Vinokur (57) ABSTRACT

Embodiments of the invention discloses a system and a method for determining an encrypted edit distance as an encryption of a minimum cost of transformation of a first sequence into a second sequence based on an insertion cost, a deletion cost, and a substitution cost. The method determines recursively a current element of the matrix as an encryption of a minimum of a first element, a second element, and a third element to produce the dynamic programming solution, wherein the first element represents the insertion cost, the second element represents the deletion cost, and the third element represents the substitution costs, and wherein the current element, the first element, the second element, and the third element are homomorphically encrypted with a public key; and selects the dynamic programming solution as the encrypted edit distance, wherein steps of the method are performed by a first processor and a second processor.

11 Claims, 7 Drawing Sheets

(56) References Cited

OTHER PUBLICATIONS

Atallah et al, "Secure outsourcing of sequence comparisons" [Online], Mar. 8, 2005 [Retrieved on: Oct. 18, 2012], Springer-Verlag [www.springerlink.com], [Retrieved from: http://www.springerlink.com/content/p2w67106182m1k1n/fulltext.pdf ].*

Melchor et al, "A Collusion-Resistant Distributed Scalar Product Protocol With Application to Privacy-Preserving Computation of Trust" [Online], The Eighth IEEE International Symposium on Network Computing and Applications, Jul. 9-11, 2009 [Retrieved on: Aug. 22, 2013], www.ieee.org, pp. 140-147 [Retrieved from: http://ieeexplore.ieee.org/stamp/stamp.jsp?tp=&arnumber=5190365 ].*

\* cited by examiner

```
int EditDistance(char s[1..n], char t[1..n])
{
  // d is a table with m+1 rows and n+1 columns
  declare int d[0..m, 0..n]

for i from 0 to m
    d[i, 0] := i // deletion
  for j from 0 to n
    d[0, j] := j // insertion for j from 1 to n
  {
    for i from 1 to m
    {
      if s[i] = t[j] then
        d[i, j] := d[i-1, j-1]
      else
        d[i, j] := minimum
        (
          d[i-1, j] + 1,   // deletion
          d[i, j-1] + 1,   // insertion
          d[i-1, j-1] + 1  // substitution
        )
    }
  }
  return d[m, n]
}
```

```
int SecureConstantSubstitutionCost(int a, int b)
{
    declare int Q, d   // Q is alphabet size, d is a random integer
    declare int a[1..Q], int b[1..Q]
    // At the first processor
    for i from 1 to a
        a[i]:=1
    for i from a+1 to Q
        a[i]:=0
    // At the second processor
    for i from 1 to b
        b[i]:=1
    for i from b+1 to Q
        b[i]:=0
    // At second processor, Û will contain the homomorphic encryption of U
    Û = 1
    for i from 1 to Q-1
        Û := Û * [ Encrypt(b[i+1)] $^{a[i]}$ * [ Encrypt(b[i]) ] $^{-a[i+1]}$
    // At the second processor, for a randomly choosen integer d
    d:= random(N)
    V:= Û *Encrypt(d)
    // V is sent to the first processor decrypts. Them, at the first processor
    W:=Decrypt(V)
    X:=Encrypt(W$^2$)
    // X sent to second processor. At second processor
    Y:=X*U^(-2d)*Encrypt(-d$^2$)
    return Y // encrypted substitution cost
}
```

Fig. 6

```
int SecureAbsoluteDistanceSubstitutionCost(int a, int b)
{
    declare int Q  // Q is alphabet size
    declare int a[1..Q], int b[1..Q]
    // At the first processor
    for i from 1 to a
        a[i]:=1
    for i from a+1 to Q
        a[i]:=0
    // At the second processor
    for i from 1 to b
        b[i]:=1
    for i from b+1 to Q
        b[i]:=0
    // At second processor, Y will contain the homomorphic encryption of U
    Y = 1
    for i from 1 to Q
        Y := Y * ξ(a[i]) *ξ(b[i]) *ξ(b[i])$^{-2\ a[i]}$
    return Y // encrypted substitution cost
}
```

METHOD FOR PRIVACY-PRESERVING COMPUTATION OF EDIT DISTANCE OF SYMBOL SEQUENCES

FIELD OF THE INVENTION

This invention relates generally to determining an edit distance between two symbol sequences, and more particularly to determining securely an encrypted edit distance between two symbol sequences.

BACKGROUND OF THE INVENTION

An edit distance, also called Levenshtein distance, between two symbol sequences is typically defined as the minimum number of edit operations required to transform a first sequence to a second sequence, with the allowable edit operations being insertion, deletion, or substitution of a single symbol at a time. The symbols can be bits, characters, numbers, glyphs, deoxyribonucleic acid (DNA) nucleotides, optical character recognition (OCR) characters, or fingerprint minutia maps, to name but a few examples.

The edit distance is an important measure in a number of bioinformatics and data-mining applications. Further, the length of the longest subsequence that is common to two input sequences is related to the edit distance. For example, the longest common subsequence in two input character strings "JANUARY" and "FEBRUARY" is "UARY".

The edit distance and the length of the longest common subsequence can both be determined via dynamic programming, e.g., using Wagner-Fischer or Needleman-Wunsch methods. If the lengths of the symbol sequences are n and m respectively, the dynamic programming solution involves determining the entries of a matrix of size n×m.

Figure 1:
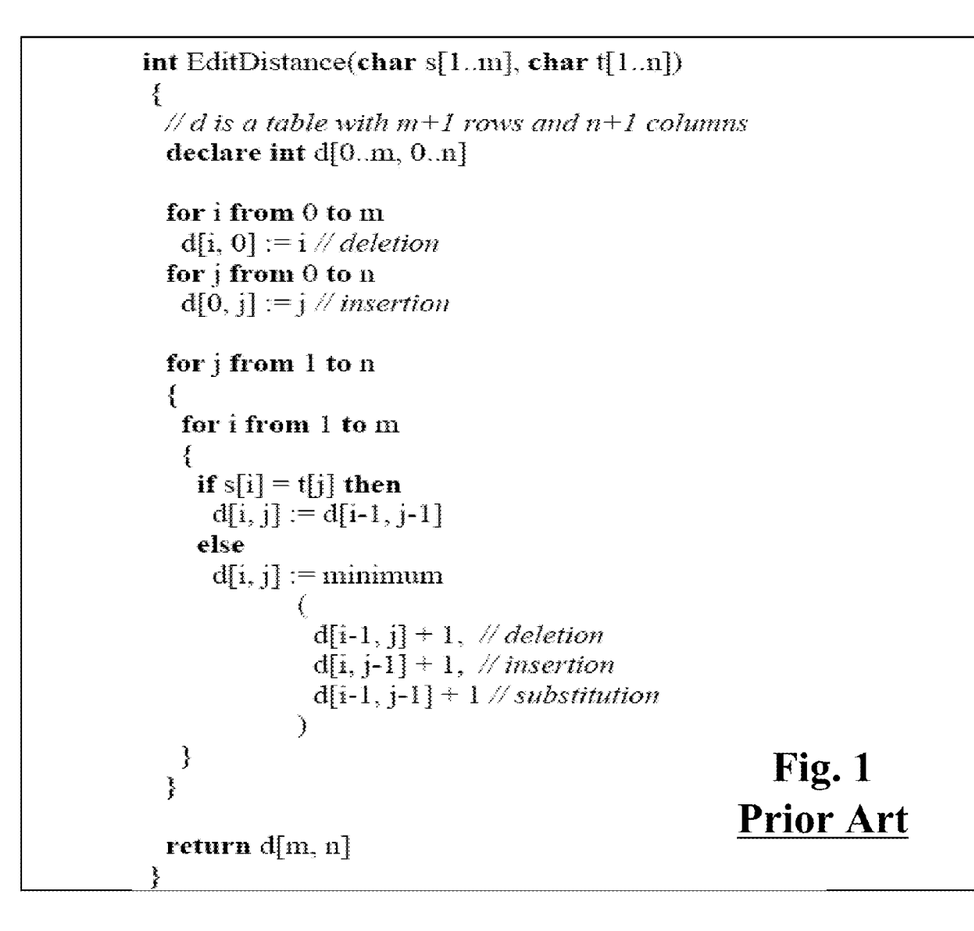
FIG. 1 is pseudocode of a prior art function EditDistance that takes two input symbol sequences, s of length m, and t of length n, and computes the edit distance between those two input sequences.

FIG. 1 shows pseudocode for a function EditDistance that takes two input character strings, s of length m, and t of length n, and computes the edit distance between those two strings.

Figure 2:
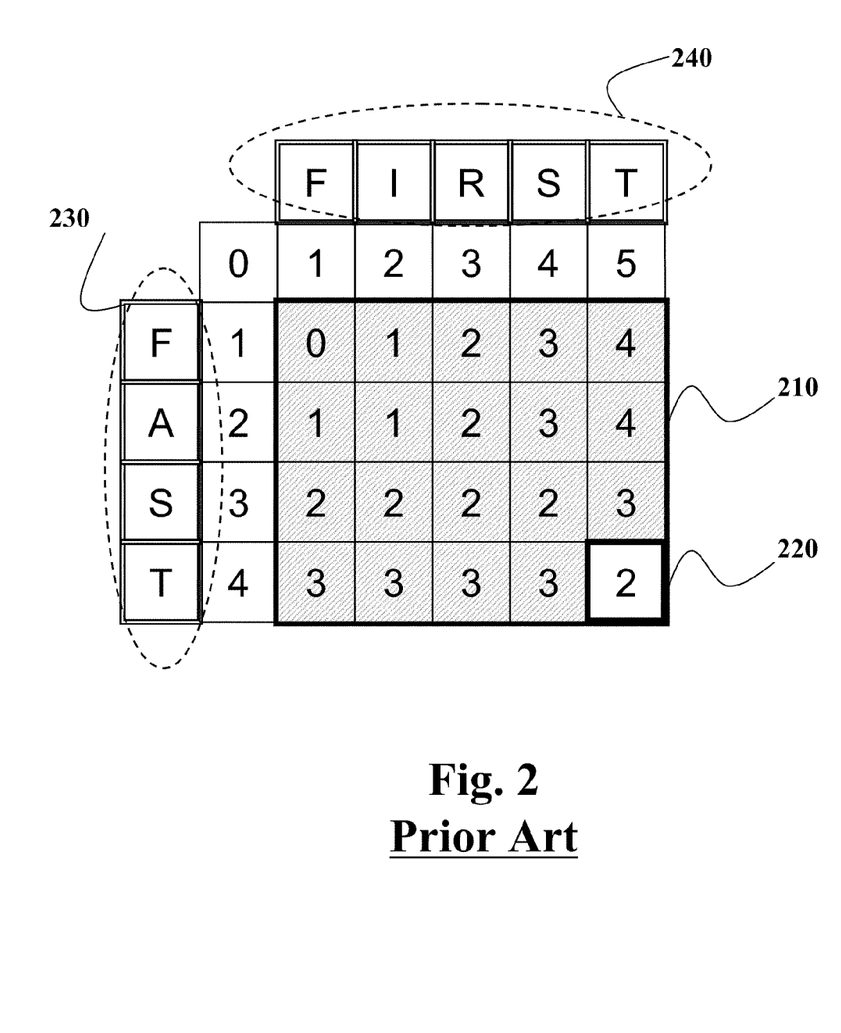
FIG. 2 is a matrix 210 used by a dynamic programming solution for two character strings "FAST" and "FIRST;"

FIG. 2 shows a matrix 210 used by the dynamic programming solution for two character strings "FAST" 230 and "FIRST" 240. Elements of the matrix are determined recursively based on values of previously determined elements. At the end, the bottom-right element of the matrix provides the edit distance 220.

However, the dynamic programming solution does not provide privacy. If two processors use the dynamic programming solution to find the edit distance between the sequences, each processor knows all the symbols from each string. In some applications, it is necessary to determine the edit distance without disclosing the symbols from the sequences.

In an example of such applications that require privacy, a first processor that stores information about a patient whose DNA sequence is to be examined for susceptibility to genetic disorders, using for example the Smith-Waterman algorithm. A second processor has a database of sequences corresponding to these disorders. The patient information is not to be revealed to the second processor in order to preserve the privacy of the patient. Similarly, the second processor does not want to reveal the database to protect the business, since isolating the sequences in the database may have required significant research, time and investment. Nevertheless, the second processor and the first processor need to determine the edit distance between DNA sequence of the patient and DNA sequences stored in the database to determine if the DNA sequence of the patient approximately matches any of the diagnostic DNA sequences in the database of the second processor. DNA profiling in forensic sciences has similar privacy requirements.

Determining the edit distance under privacy constraints can use secure multiparty computation (SMC). In SMC, two parties can securely compute any function of their inputs as long as that function can be expressed as an algebraic circuit. However, solutions of two-party computation problem, in which outputs and inputs are related by an algebraic circuit, are complicated to implement, even for a very small number of input sequences. Specifically, those methods rely on oblivious transfer protocols which have high computational complexity, and a high communication overhead. For a practical solution to problems, such as the DNA matching problems described above, it is necessary to devise secure protocols, which have manageable computational complexity and require a relatively small number of encrypted transmissions amongst the two parties.

For example, one method determines the edit distance securely using a third semi-honest but trusted processor. However, the third processor is not always available. Furthermore, the third processor can collude with one of the processors and thereby discover the sequences processed by the other processor.

Another method discloses a two-party symmetric protocol, i.e., two processors incur exactly equal protocol overhead in terms of computational complexity and communication. At the end of the protocol, the two processors each possess additive shares of the m×n matrix described above, from which the edit distance is obtained. However, that method requires a large number of encrypted transmissions between the processors. Moreover, the method works efficiently only for a very limited variety of substitution costs.

Accordingly, there is a need to find a computationally efficient method for determining securely an encrypted edit distance between two symbol sequences.

SUMMARY OF THE INVENTION

The embodiments of the invention disclose a minimum-finding method configured to determine an encryption of a minimum of numbers in homomorphically encrypted form.

One embodiment of the invention discloses a method for determining an encrypted edit distance as an encryption of a minimum cost of transformation of a first sequence into a second sequence based on an insertion cost, a deletion cost, and a substitution cost. The method determines recursively a current element of the matrix as an encryption of a minimum of a first element, a second element, and a third element to produce the dynamic programming solution, wherein the first element represents the insertion cost, the second element represents the deletion cost, and the third element represents the substitution costs, and wherein the current element, the first element, the second element, and the third element are homomorphically encrypted with a public key. The method selects the dynamic programming solution as the encrypted edit distance. Steps of the method are performed by a first processor and a second processor, such that the first sequence is stored only at the first processor and is kept private from the second processor, and the second sequence is stored only at the second processor and is kept private from the first processor.

Another embodiment of the invention discloses a system configured to determine an encrypted edit distance as an encryption of a minimum cost of transformation of a first sequence into a second sequence based on an insertion cost, a deletion cost, and a substitution cost, wherein the minimum cost is a dynamic programming solution of a matrix, wherein elements of the matrix are determined recursively based on values of previously determined elements.

The system includes a first processor configured to interact with a second processor to determine a current element of the matrix as an encryption of a minimum of a first element, a second element, and a third element, wherein the first element represents the insertion cost, the second element represents the deletion cost, and the third element represents the substitution costs, and wherein the current element, the first element, the second element, and the third element are homomorphically encrypted with a public key.

The system further includes a second processor configured to determine the first element, the second element, and the third element based on properties of additive homomorphic encryption, wherein the first sequence is stored only at the first processor and is kept private from the second processor, and the second sequence is stored only at the second processor and is kept private from the first processor; means for determining recursively the dynamic programming solution; and means for selecting the dynamic programming solution as the encrypted edit distance.

DETAILED DESCRIPTION OF THE PREFERRED EMBODIMENT

Encrypted Edit Distance

Figure 3:
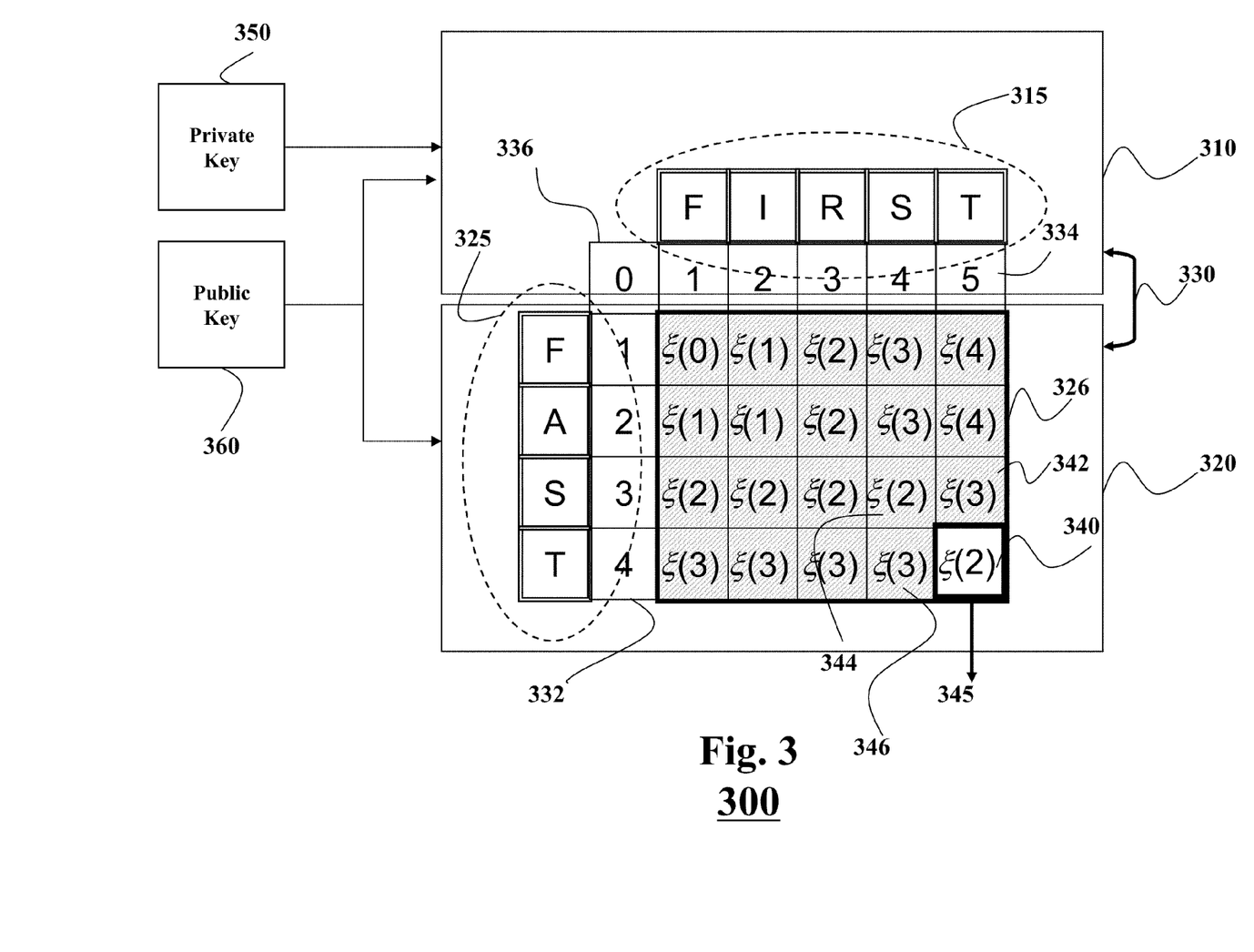
FIG. 3 is a schematic of a method for determining securely an encrypted edit distance according to embodiments of the invention.

FIG. 3 shows a schematic of a method 300 determining securely an encrypted edit distance 345 as an encryption of a minimum cost of transformation of a first sequence 315 of symbols into a second sequence 325 of symbols. The cost of transformation is determined based on an insertion cost 332, a deletion cost 334, and a substitution cost 336, as described in more details below. As defined herein, the insertion cost is a cost of inserting a symbol into the second sequence, the deletion cost is a cost of deleting the symbol from the second sequence, and the substitution cost is a cost of substituting the symbol from the second sequence with a symbol from the first sequence.

The symbols in the sequences 315 and 325 can be, e.g., bits, characters, numbers, and DNA nucleotides. In various embodiments of the invention, the substitution cost, the insertion cost and the deletion cost are constant or dependent on the symbol being substituted, inserted or deleted.

Steps of the method 300 are performed by a first processor 310 and a second processor 320, such that the first sequence is stored only at the first processor, and the second sequence is stored only at the second processor. Data transmitted 330 between the first and second processors are homomorphically encrypted with a public key 360. The public key is available to both the first and second processors. However, only the first processor has the private key 350, and thus, only the first processor is able to decrypt the symbols.

Embodiments of the invention formulate a minimum cost of transformation as a dynamic programming solution of a system, i.e., a matrix 326. Encrypted ($\zeta$) elements of the matrix are determined recursively based on values of previously determined elements.

The first sequence $x=\{x_i\}_{i=1}^n$ and the second sequence $y=\{y_j\}_{j=1}^m$ are inputs to the method 300. The symbols $x_i$ and $y_j$ belong to finite alphabet set A (not shown). For convenience, the subsequence $\{x_i\}_{i=a}^b$ is shown as $\{x\}_{i=a}^b$, where the indices a, b are within proper limits, the insertion cost of a symbol $Y_k$ is $I(y_k)$, the deletion cost of a symbol $X_k$ with a symbol $Y_i$ is $S(x_k, y_i)$, wherein k, and i are indices of the symbols in the sequences.

The insertion cost $I(y_k)$, the deletion cost $D(x_k)$, and the substitution cost $S(x_k, y_i)$ vary among different embodiments.

If M(i, j) is the minimal cost of transforming a subsequence $x_1^i$ into a subsequence $y_1^j$, then for $1 \leq i \leq n$ and $1 \leq j \leq m$;

$$M(0,0)=0,\ M(0,j)=\sum_{k=1}^{j}I(y_k),\ M(i,0)=\sum_{k=1}^{i}D(x_k) \quad (1)$$

$$M(i,j)=\min\begin{pmatrix} M(i-1,j)+D(x_i) \\ M(i,j-1)+I(y_j) \\ M(i-1,j-1)+S(x_i,y_j) \end{pmatrix}$$

As described above, the elements of the matrix in Equation (1) are determined recursively, i.e., M(i, j) are computed using M(i−1, j), M(i,j−1) and M(i−1,j−1). Further, the edit distance M(n, m) is the minimal cost of transforming the first sequence $x_1^n$ to the second sequence $y_1^m$. In the example shown in FIG. 3, the edit distance 340 between the character strings "FAST" and "FIRST" is M(4, 5)=2.

The method 300 determines elements of the matrix in encrypted domain at the second processor, and the second processor cannot decrypt values of the elements without the private key. Embodiments of the invention are based on the realization that it is possible to securely determine a minimum number from the set of encrypted numbers based on properties of semantically secure homomorphic encryption.

The dynamic programming solution 345 is selected as the encrypted edit distance. The encrypted edit distance can be stored in a memory (not shown) and/or transmitted to the first processor for the decryption with the private key.

Figure 4:
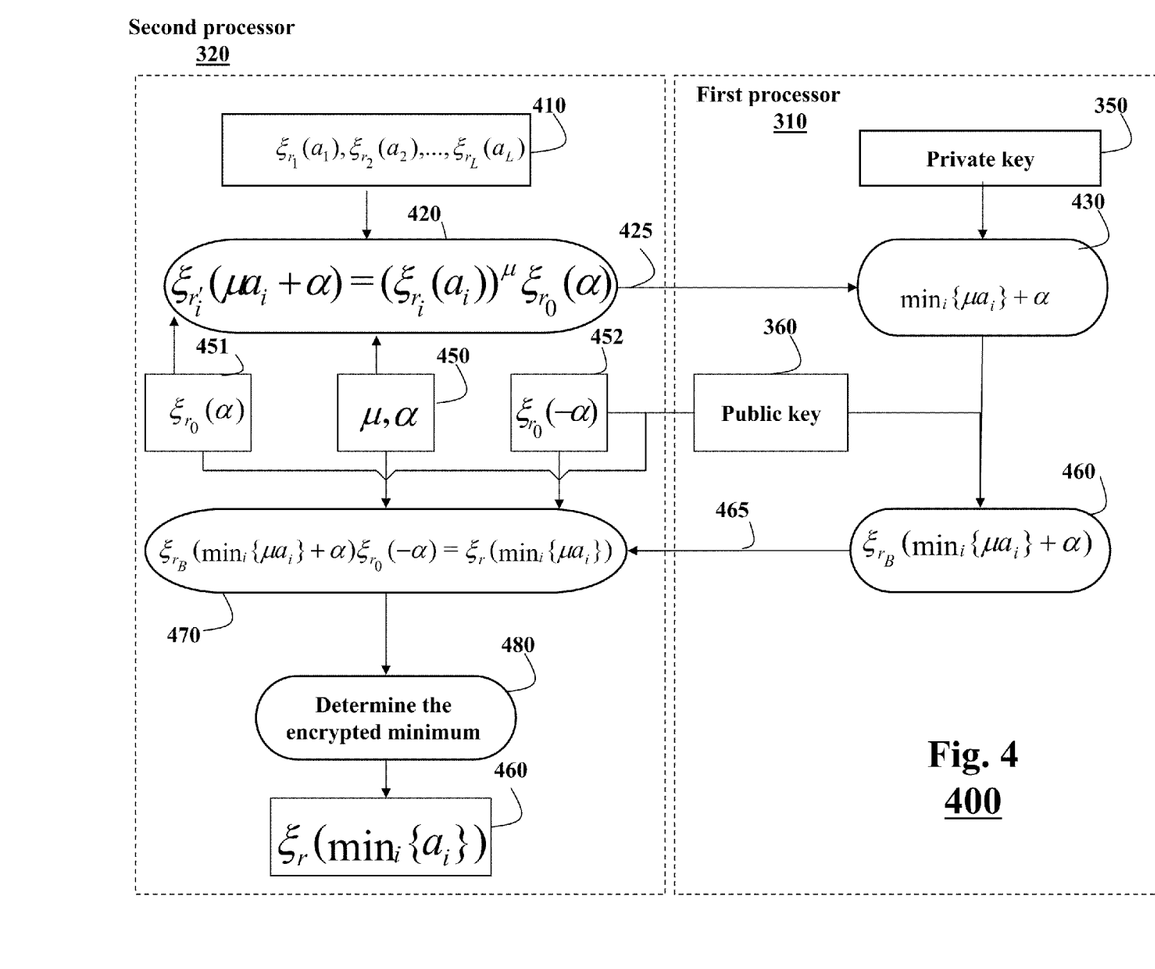
FIGS. 4-5 are block diagrams of a method for determining an encryption of a minimum number in a set of encrypted numbers according to embodiments of the invention.
Figure 5:
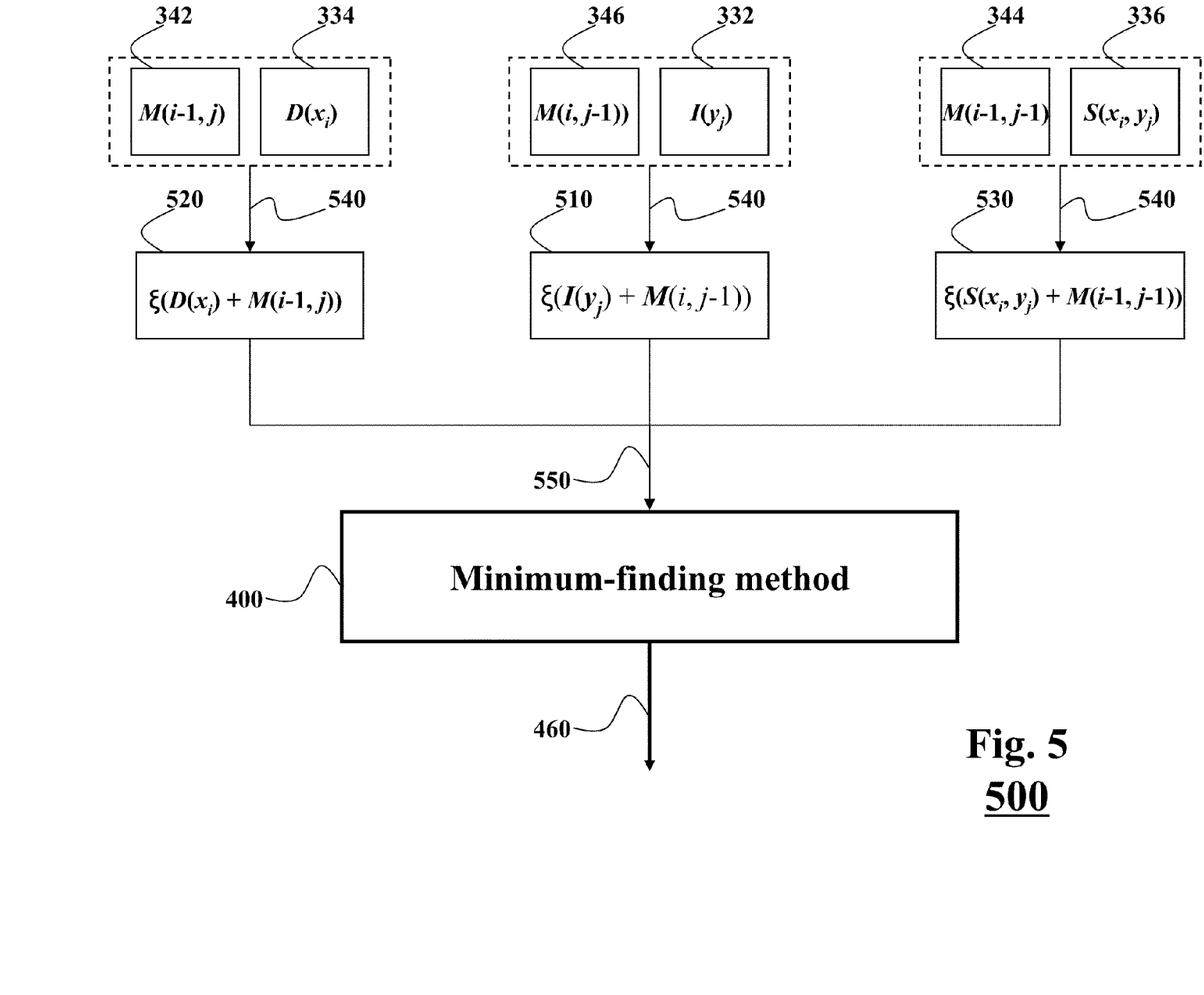

FIG. 5 shows the determination of the edit distance reduced to computing M(i, j) according to Equation (1). For every i and j, $1 \leq i \leq n$, $1 \leq j \leq m$, of the first sequence and the second sequence, respectively, the first and second processors determine, using a minimum-finding method 400, a current element 460 of the matrix as an encryption of a minimum of a first element 510, a second element 520, and a third element 530, wherein the first element represents the insertion cost 332, the second element represents the deletion cost 334, and the third element represents the substitution costs 336, and wherein the current element, the first element, the second element, and the third element are homomorphically encrypted 540 with the public key 360. The encrypted value of the current element M(i,j) is determined according to $\xi(\min\{M(i-1,j-1)+S(x_i,y_i),M(i-1,j)+D(x_i),M(i,j-1)+I(y_j)\})=\xi(M(i,j))$ The encryptions of the values M(i−1,j−1) 344, M(i,j−1) 346 and M(i−1,j) 342 are determined by previous iteration of the method 300. Encryption of the insertion cost $I(y_j)$, i.e., $\xi(I(y_j))$, is transmitted from the first processor to the second processor. The deletion cost $D(X_i)$, and hence an encryption $\xi(D(x_i))$ is available to the second processor. Encryption of the substitution cost $S(x_i, y_j)$, i.e., $\xi(S(x_i, y_j))$ is provided or determined dynamically as described below.

The first element representing the insertion cost is determined based on properties of additive homomorphic encryption according to $$\xi(I(y_j))\xi(M(i,j-1)) = \xi(I(y_j) + M(i,j-1)).$$

The second element representing the deletion cost is determined based on properties of additive homomorphic encryption according to $$\xi(D(x_i))\xi(M(i-1,j)) = \xi(D(x_i) + M(i-1,j)).$$

The third element representing the substitution cost is determined based on properties of additive homomorphic encryption according to $$\xi(S(x_i,y_j))\xi(M(i-1,j-1)) = \xi(S(x_i,y_j) + M(i-1,j-1)).$$

Then, the minimum-finding method receives 550 as inputs the first element, the second element and the third element, and determines the current element as encrypted value of the minimum. In the embodiments, the current element, the first element, the second element, and the third element are homomorphically encrypted with the public key.

In some embodiments, representation of the substitution cost for an initial element $M(1, 1)$, i.e., $M(0, 0)+S(x_1, y_1)$, is less than or equal to both elements $M(0, 1)$ and $M(1, 0)$ for all possible $x_1, y_1$. Moreover, the insertion and the deletion costs are equal for all symbols and known to both processors. One such commonly occurring example is shown in FIGS. 2 and 3, in which $M(0, 0)=0$, $S(x_1, y_1)=1$, In this embodiment, the insertion and the deletion cost for any symbol is 1, so both processors know that $M(0, 1)=M(1, 0)=1$. Accordingly, the encryption of the element $M(1, 1)$ is not determined using the minimum-finding method.

In this embodiment, the second processor determines the initial encrypted element according to $\xi(M(1, 1))=\xi(S(x_1, y_1))$ using appropriate substitution cost. In different embodiments, the encryption of the substitution cost is either predetermined, or computed dynamically as described below.

After determining recursively the encryption of each element in the matrix M, in one embodiment, the second processor transmits a value of the encrypted edit distance $\xi(M(n,m))$ to the first processor. The first processor decrypts this value and obtains the edit distance between two sequences $x_1^n$ and $y_1^m$. In one embodiment, the first processor transmits the value of the edit distance back to the second processor. Thus, the edit distance is determined without violating privacy, i.e., the first signal is known only to the first processor, and the second signal is known only to the second processor.

Homomorphic Encryption

Let P be a set of plaintexts associated with a binary operator $\cdot_P$, and H be a set of ciphertexts associated with a binary operator $\cdot_H$.

Definition 1 A mapping $\xi: P \to H$ is homomorphic if the following holds for all a, b∈P, $$\xi(a \cdot_P b) = \xi(a) \cdot_H \xi(b).$$

The embodiments use homomorphic cryptosystems in which the operator $\cdot_P$ is the addition operator and the operator $\cdot_H$ is the multiplication operator. Such cryptosystems are sometimes referred to as additively homomorphic, e.g., Benaloh and Paillier cryptosystems. Both these cryptosystems are semantically secure, i.e., repeated encryptions of the same plaintext result in different ciphertexts. Embodiments of the invention use a variety of semantically secure additively homomorphic cryptosystems. As an example, the Paillier cryptosystem is briefly summarized below.

Configuration:

Select two large prime numbers p,q, and let N=pq. Denote by $Z_{N^2}^* \subset Z_{N^2} = \{0, 1, \ldots, N^2-1\}$ the set of non-negative integers that have multiplicative inverses modulo $N^2$. Select $g \in Z_{N^2}$ such that $\gcd(L(g^\lambda \mod N^2), N)=1$, where $\lambda=\mathrm{lcm}(p-1, q-1)$, and $$L(x) = \frac{x-1}{N}.$$

Let (N,g) be the public key, and (p,q) be the private key.

Encryption:

Let $m \in Z_N$ be a plaintext. Then, the ciphertext is given by $$\xi_r(m) = g^m \cdot r^N \mod N^2 \qquad (2)$$

where $r \in Z_N^*$ is a number selected at random.

Decryption:

Let $c \in Z_{N^2}$ be a ciphertext. Then, the corresponding plaintext is determined according to $$\psi(\xi_r(m)) = \frac{L(c^\lambda \mod N^2)}{L(g^\lambda \mod N^2)} = m \mod N \qquad (3)$$

The decryption works irrespective of the value of the number r used during the encryption. Since the number r can be chosen at random for every encryption, the Paillier cryptosystem is probabilistic, and therefore semantically secure, i.e., $r_1 \neq r_2 \Rightarrow \xi_{r_1}(x) \neq \xi_{r_2}(x)$.

Also, the properties of the mapping according to Equation (2) from the plaintext set $(Z_N,+)$ to the ciphertext set $(Z_{N^2}^*,\cdot)$ satisfy the following relations $$\psi(\xi_{r_1}(m_1)\xi_{r_1}(m_2) \mod N^2) = m_1 + m_2 \mod N, \qquad (4)$$

$$\psi([\xi_r(m_1)]^{m_2} \mod N^2) = m_1 m_2 \mod N, \qquad (5)$$

wherein $m_1$ and $m_2$ are any two integer messages, which are encrypted using the cryptosystem described above. The subscripts $r_1$, r above represent the parameter 'r' in Equation (2) and are selected at the time of encryption, such that different values of 'r' in Equation (2) result in a different ciphertext. By changing the value of 'r' at every encryption, Paillier encryption achieves semantic security. In this description, the subscripts 'r' are omitted for simplicity of notation, when the notion of the semantic security is not relevant.

Some embodiments of the invention use Paillier encryption. However, other embodiments use other semantically secure additively homomorphic schemes.

Minimum-Finding Method

FIG. 4 shows a block diagram of a method 400 for determining the encryption of a minimum number in a set of encrypted numbers according to embodiments of the invention. The method 400 is used by the embodiments of the invention to determine the current element of the matrix as the encryption of the minimum of the first, the second, and the third elements.

For example, the second processor 320 stores a set of numbers in homomorphically encrypted form $\xi_{r_i}(a_i)$, e.g., $\xi_{r_1}(a_1), \xi_{r_2}(a_2), \ldots, \xi_{r_L}(a_L)$ 410 of L numbers $a_1, a_2, \ldots, a_L$. The minimum-finding method allows the second processor to determine the encryption of the minimum of these numbers, i.e., $\xi_r(\min_i\{a_i\})$ 460 for some coefficient $r \in Z_N^*$. The method 400 does not allow the second processor to discover $a_i$, or any information about the index or value of the minimum.

Similarly, the first processor does not discover any information about the numbers $a_i, a_2, \ldots, a_L$. The steps of the method are as follows:

The second processor selects positive integers $\mu$ and $\alpha$ 450 at random, i.e., $\mu$ is a scaling constant and $\alpha$ is an integer shift selected at random. For the Paillier cryptosystem, to ensure that $\mu$ can later be removed, the second processor chooses $\mu$ at random from the set $Z_N^*$. The second processor then obtains an encryption $\xi_{r_0}(\alpha)$ 451 using the public key 360, determines an encrypted summation $\xi_{r'_i}(\mu a_i+\alpha)=(\xi_{r_i}(a_i))^\mu \xi_{r_0}(\alpha)$ 420 for $i=1, 2, \ldots, L$ producing a set of encrypted summations 420 and transmits 425 the set of encrypted summations to the first processor. For the Paillier cryptosystem, the encryption coefficient $r'_i=r_ir_0$, and the second processor can not determine the encryption coefficient $r'_i$ without knowing the encryption coefficient $r_i$.

The first processor decrypts the numbers with the private key 350, determines the minimum given by $\min_i\{\mu a_i\}+\alpha$ 430 and then re-encrypts the result with the public key to produce an encrypted minimum $\xi_{r_B}(\min_i\{\mu a_i\}+\alpha)$ 460 and transmits 465 the encrypted minimum back to the second processor. The second processor computes $\xi_{r_0}(-\alpha)$ 452, and determines $\xi_{r_B}(\min_i\{\mu a_i\}+\alpha)\xi_{r_0}(-\alpha)=\xi_r(\min_i\{\mu a_i\})$ 470.

Note that, with very high probability, $\xi_r(\min_i\{\mu a_i\})$ is not equal to any one of the encryptions $\xi_{r_i}(a_i)$, because the first processor selects a random encryption coefficient $r_B$ unknown to the second processor, which makes the encryption semantically secure. This ensures that, when the second processor obtains the encryption of the minimum, the index of the minimum in the original sequence $\xi_{r_1}(a_1), \xi_{r_2}(a_2), \ldots, \xi_{r_L}(a_L)$ remains hidden from the second processor.

4. The second processor determines 480, which is the encrypted minimum 460 according to $$(\xi_r(\min_i\{\mu a_i\}))^{1/\mu}=(\xi_r(\mu\min_i\{a_i\}))^{1/\mu}=\xi_r(\min_i\{a_i\})$$

Note that the use of positive integers $\mu$ and $\alpha$ prevents the first processor from discovering any information of the numbers $a_i$. Further, due to semantic security, the second processor cannot discover the index 'i' of the minimum. Finally, since the second processor does not have the decryption key, the second processor cannot determine the actual value of the minimum.

To determine the edit distance, the minimum-finding method is performed with three values, i.e., L=3 above. In one embodiment, each symbol has positive insertion and deletion costs, and non-negative substitution costs.

In other embodiments, some symbols have a negative or zero insertion cost and/or negative or zero deletion cost. Additionally or alternatively, all the three entries corresponding to the insertion cost, deletion cost and substitution cost can be equal. In such cases, even though the first processor cannot determine values of the variable $\mu$ and $\alpha$, the first processor can determine the minimum value based on the insertion cost of each symbol.

In such embodiments, the second processor appends two or more "dummy" variables to the vector, $\xi_{r_1}(a_1), \xi_{r_2}(a_2), \ldots, \xi_{r_L}(a_L)$, i.e., L>3. In each iteration of minimum-finding method, different dummy variables and/or number of the dummy variables are used, in order to prevent the first processor from obtaining any information about the dummy variables. Then, after decrypting and determining the minimum, the first processor determines and transmits one or more encrypted values to the second processor.

For example, in some embodiments, the second processor appends dummy variables $\xi(A)$ and $\xi(B)$ to the vector $\xi_{r_1}(a_1), \xi_{r_2}(a_2), \ldots, \xi_{r_L}(a_L)$ where a variable A is large and a variable B is small compared with all values of the $a_i$. Then, the second processor requests the encryptions of the two smallest values from the first processor, specifying which value is the smallest and which value is the second smallest.

Since the first processor knows that the smallest value corresponds to the variable B, the second processor discards the encrypted element corresponding to the index of the minimum value received from the first processor, and selects the encryption of the second smallest value as the encrypted value of the true minimum.

In some embodiments, instead of having a common constant $\alpha$, the second processor uses $\mu$ as a power of 2 and selects various unequal constants $\alpha_1, \alpha_2, \ldots, \alpha_L$ such that $\alpha_i<\mu$ for all $i=1, 2, \ldots, L$. The second processor transmits the encryptions $\xi(\mu a_i+\alpha_i)$ to the first processor. Then, the first processor decrypts the encryption and determines a minimum $\min_i \mu a_i + \alpha_i$. However, instead of transmitting back the encryption of the minimum, the first processor converts the minimum to binary, encrypts each bit and transmits the encrypted bits to the second processor. Since the second processor selected the values of $\alpha_1, \alpha_2, \ldots, \alpha_L$, the second processor knows exactly how many bits have been utilized for the $\alpha_i$ and knows that the remaining bits have been utilized for the desired minimum value scaled by $\mu$. Note that there is no overlap between these bits because $\alpha_i<\mu$ for all $i=1, 2, \ldots, L$. So, using the properties of homomorphic encryption, the second processor obtains the bits corresponding to the minimum value scaled by $\mu$. Then, the second processor reverses the multiplication by $\mu$. The first processor is prevented from knowing the value of the minimum, even when one or more of the $a_i$ values are equal.

Determining Substitution Costs

Embodiments of the invention determine the current element of the matrix as an encryption of the minimum of elements representing the insertion cost, the deletion cost, and the substitution costs. In different embodiments the insertion cost, the deletion cost, and the substitution cost are predefined, determined dynamically, or a combination thereof is used.

For example, in one embodiment, the insertion cost, the deletion cost, and the substitution costs are predefined. In one variation of these embodiments all costs are integer values. In another embodiment, the insertion and the deletion costs are predefined, but the substitution cost is determined dynamically. In one variation of this embodiment, the substitution cost is determined based on values of the symbols to be substituted.

Constant Substitution Cost

In one embodiment, the substitution cost is a constant when the symbols of the first and the second sequences are different, and zero when the symbols are identical. One variation of this embodiment, maps the symbols in the alphabet to an integer set $\{1, 2, 3, \ldots, Q\}$, wherein Q is the size of the alphabet set. For example, for DNA sequences with symbols A,T, C, G the size Q=4. The substitution cost in this embodiment is $S(a, b)=0$ if $a=b$ and $S(a, b)=1$ if $a \neq b$, wherein a is a symbol of the first sequence, and b is a symbol of the second sequence.

Figure 6:
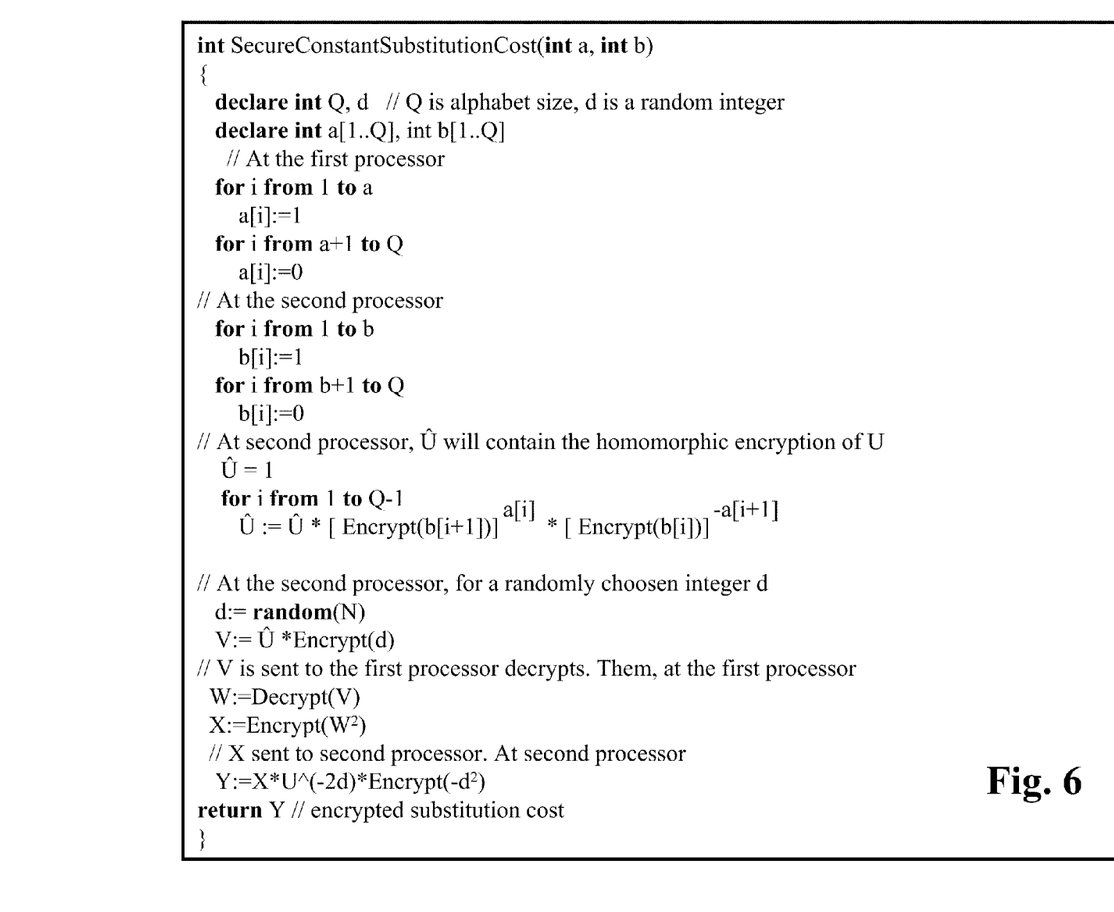
FIG. 6-7 are pseudocode of a method for determining substitution cost according to embodiments of the invention.

FIG. 6 shows pseudocode of a method for determining a constant substitution cost according to following steps.

1. The first processor converts the symbol 'a' of the first string to a first binary sequence of length Q having first 'a' bits equal to 1 and the last Q−a bits equal to 0. The bits from the first binary string are defined as $a_i$, where i goes from 1 to Q. Similarly, the second processor converts the symbol 'b' of the second sequence to a second binary sequence of length Q having the first 'b' bits equal to 1 and the last Q-b bits equal to 0.

2. The first processor transmits the encryption of each bit in the first binary sequence to the second processor.

3. The second processor computes a 2×2 determinant from the first and second bits from the second binary string, and the first and second encrypted bits from the first binary sequence according to $\xi(U_1)=\xi(a_1b_2-a_2b_1)=\xi(a_1b_2)\xi(-a_2b_1)=[\xi(b_2)$ raised to the power $a_1]*[\xi(b_1)$ raised to the power $(-a_2)]$.

4. The second processor repeats the previous step for the second and third bits from both binary sequences, then the third and fourth bits, and so on until the entire sequence of length Q is exhausted. Thus, the second processor determines the encrypted 2×2 determinants $\xi(U_1), \xi(U_2), \ldots, \xi(U_{Q-1})$.

5. The second processor computes a sum of determinants $\xi(U)$ as $\Pi_i \xi(U_i) = \xi(\Sigma_i U_i)$ where i varies from 1 to Q-1. This uses the property of additive homomorphic encryption.

6. The second processor selects a number d at random, and computes $\xi(U+d)=\xi(U)\xi(d)$ and transmits the result to the first processor.

7. The first processor decrypts the two numbers, determines the product $(U+d)^2=U'$, encrypts the product U' and transmits $\xi(U')$ back to the second processor.

8. The second processor computes $\xi(U')\xi(-2dU)\xi(-d^2)=\xi(U'-2dU-d^2)=\xi(U^2)$.

By construction, U=0, 1 or −1. Therefore, $U^2$ is either 0 or 1 depending on whether the symbols 'a' and 'b' are the same or different respectively. Thus, $\xi(U^2)$ provides the encrypted value of the substitution cost. The second processor only obtains the encrypted substitution cost but not the actual substitution cost since the second processor does not have the decryption key. The first processor knows nothing, due to lack of knowledge of the number "d."

Absolute Distance Substitution Cost

In another embodiment, the substitution cost is an absolute distance between symbols of the first and the second sequence, i.e., if the symbols are 'a' and 'b' respectively, then the substitution cost S(a, b)=|a −b|. Similarly to the aforementioned embodiment, the symbols in the alphabet are mapped to an integer set $\{1, 2, 3, \ldots, Q\}$. According to the minimization protocol, the first processor can determine the encryption of the substitution cost. The second processor cannot.

Figure 7:
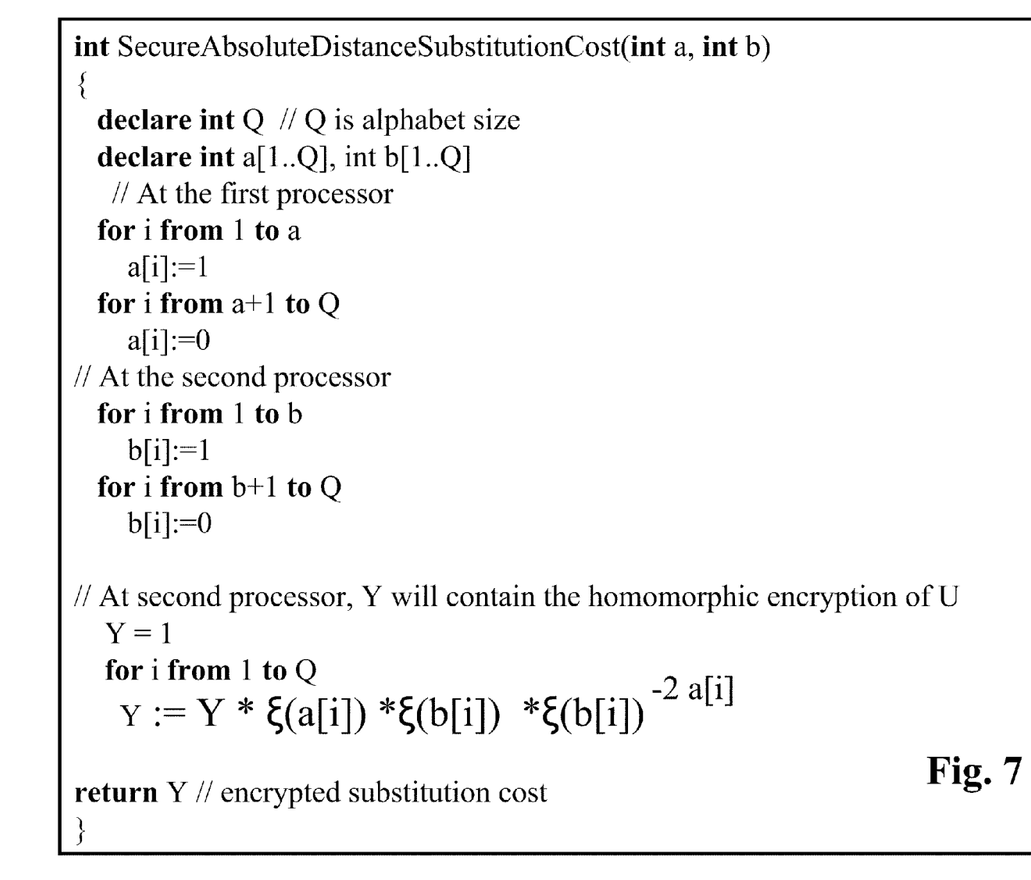

FIG. 7 shows pseudocode of a method for determining an absolute distance substitution cost according to following steps.

1. The first processor converts the symbol 'a' of the first sequence to a first binary sequence of length Q having a first 'a' bits equal to 1 and the last Q-a bits equal to 0. The bits from the first binary sequence are defined as $a_i$, where i ranges from 1 to Q. Similarly, the second processor converts the symbol 'b' of the second sequence to a second binary sequence of length Q having the first 'b' bits equal to, 1 and the last Q-b bits equal to 0.

2. The first processor transmits encryption of each bit in the binary sequence to the second processor.

3. The second processor determines encryption of the substitution cost $\xi(S(a, b))$ based on the properties of additive homomorphic encryption according to 4. $\xi(S(a,b)) =$ $$\xi(|a-b|) = \xi\left(\sum_i a_i \oplus b_i\right) = \xi\left(\sum_i a_i + b_i - 2a_ib_i\right) = \xi\left(\sum_i a_i\right)\xi\left(\sum_i b_i\right)$$

$$\xi\left(\sum_i -2a_ib_i\right) = \prod_{i=1}^Q \xi(a_i) \prod_{i=1}^Q \xi(b_i) \prod_{i=1}^Q \xi(-2a_ib_i) =$$

$$\prod_{i=1}^Q \xi(a_i) \prod_{i=1}^Q \xi(b_i) \prod_{i=1}^Q \xi(b_i)^{-2a_i}.$$

Polynomial Function Substitution Cost

In another embodiment, the substitution cost is a result of an application of a polynomial function to the symbols of the two sequences, as described in U.S. patent application Ser. No. 12/495,721, incorporated herein by reference. For example, the second processor stores an integer a and the first processor stores an integer b. The embodiment determines, at the second processor, the substitution cost $S(a,b)=\Sigma_{i,j} c_{ij} a^i b^j$ in encrypted form.

The substitution cost $S(a,b)=(a-b)^s$ is a polynomial of degree s in b, i.e., $0 \le j \le s$. Thus, the second processor determines the substitution cost $\xi_r(\Sigma_{i,j} c_{ij} a^i b^j)$ for some encryption coefficient $r \in Z_N^*$. The second processor is not able to decrypt the substitution cost because the second processor does not possess the private key. The first processor knows only the value of integer b. The steps are as follows:

1. For $0 \le j \le s$, the first processor encrypts $b_j$ and transmits $\xi_{r_B}(b^j)$ to the second processor.

2. The second processor based on values of $c_{i,j}$ and a, determines $$\xi_r(S(a, b)) = \xi_r\left(\sum_{i,j} c_{ij} a^i b^j\right) = \prod_{i,j} \xi_{r_B}(b^j)^{c_{ij} a^i}. \quad (6)$$

This method incurs a significantly lower computation and communication overhead for polynomial evaluation compared with the methods based on oblivious transfer. Methods based on the oblivious transfer become extremely complex and incur a large transmission overhead even for very simple polynomials.

Longest Common Subsequence

One embodiment of the invention determines the length of the longest common subsequence between the first and the second sequences. This embodiment is similar in many respects to the embodiments for determining the edit distance. There are only two main differences:

First, instead of computing minimum of three elements at each step of the method, the embodiment determines a maximum of three elements. For example, for numerical values, the two processors reverse the signs of all the values, and use the minimum-finding method described above.

Second, instead of selecting the edit distance as the last element M(n, m) of the matrix, we search the entire matrix and find the maximal element in the matrix. An encryption of the maximal element can be found by reversing the sign of each element in the matrix M and applying the minimization protocol described earlier. Then, the obtained result is sent to the first processor who decrypts it to obtain the maximal element. This maximal element gives the length of the longest common subsequence. This means that after computing the entire matrix, the two processors perform one more maximum-finding protocol with mn encrypted elements to obtain the desired result, which is the encryption of the length of the longest common subsequence.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining an encrypted edit distance as an encryption of a minimum cost of transformation of a first sequence into a second sequence based on an insertion cost, a deletion cost, and a substitution cost, comprising steps of:
   formulating the minimum cost as a dynamic programming solution of a matrix, wherein elements of the matrix are determined recursively based on values of previously determined elements;
   determining a current element of the matrix as an encryption of a minimum of a first element, a second element, and a third element, wherein the first element represents the insertion cost, the second element represents the deletion cost, and the third element represents the substitution costs, and wherein the current element, the first element, the second element, and the third element are homomorphically encrypted with a public key;
   determining the current element using a minimum-finding method, wherein the minimum-finding method is configured to determine an encryption of a minimum of numbers in homomorphically encrypted form;
   determining, for each of the first element, the second element, and the third element, an encrypted summation producing a set of encrypted summations, wherein the encrypted summation is determined according to $$\xi_{r'_i}(\mu a_i + \alpha) = (\xi_{r_i}(a_i))^\mu \xi_{r_0}(\alpha),$$

wherein $i=1, 2, \ldots L$, and $L=3$, $\mu$ is a scaling constant and $\alpha$ is an integer shift selected at random, $r_i$, $r_0$ are encryption coefficients selected at random, an encryption coefficient $r'_i = r_i r_0$, and $\xi(.)$ is an encryption function;
   transmitting from the second processor to the first processor the set of encrypted summations, wherein the first processor is configured to decrypt, the encrypted summation using a private key, to determine a minimum from the set of encrypted summations, and to encrypt the minimum with the public key to produce the current element; and
   receiving by the second processor the current element transmitted from the first processor;
   repeating the determining recursively to produce the dynamic programming solution;
   selecting the dynamic programming solution as the encrypted edit distance, wherein steps of the method are performed by a first processor and a second processor, such that the first sequence is stored only at a memory connected to the first processor and is kept private from the second processor, and the second sequence is stored only at a memory connected to the second processor and is kept private from the first processor;
   providing the public key to the first processor and to the second processor;
   providing a private key only to the first processor;
   transmitting the encrypted edit distance to the first processor; and
   decrypting the encrypted edit distance with the private key, wherein a distribution of computational tasks and computational complexity between the first and second processors is unequal, wherein the method is performed in the first and second processors.

2. The method of claim 1, wherein the determining is based on properties of semantically secure homomorphic encryption.

3. The method of claim 1, further comprising:
   determining an initial element of the matrix as the substitution cost, wherein the first element is a first symbol of the first sequence, and the second element is a first symbol of the second sequence.

4. The method of claim 1, further comprising:
   determining the current element according to $$\xi(\min\{M(i-1,j-1)+S(x_i,y_j), M(i-1,j)+D(x_i), M(i,j-1)+I(y_j)\}) = \xi(M(i,j)),$$

wherein $\xi(.)$ is an encryption function, $M(i,j)$ is the current element, $I(y_j)$ is the insertion cost of a symbol $y_j$, $D(x_i)$ is the deletion cost of a symbol $x_i$, and $S(x_i,y_j)$ is the cost of substitution of the symbol $x_i$ with the symbol $y_j$, and wherein i,j are indices of the symbols in the sequences.

5. The method of claim 4, further comprising:
   determining the first element based on properties of additive homomorphic encryption according to $$\xi(I(y_j))\xi(M(i,j-1)) = \xi(I(y_j)+M(i,j-1));$$

determining the second element based on properties of additive homomorphic encryption according to $$\xi(D(x_i))\xi(M(i-1,j)) = \xi(D(x_i)+M(i-1,j)); \text{ and}$$

determining the third element based on properties of additive homomorphic encryption according to $$\xi(S(x_i,y_j))\xi(M(i-1,j-1)) = \xi(S(x_i,y_j)+M(i-1,j-1)).$$

6. The method of claim 5, further comprising:
   transmitting the first element, the second element, and the third element to the first processor.

7. The method of claim 1, further comprising:
   selecting the scaling constant $\mu$ as a power of 2;
   selecting by the second processor different integer shifts $\alpha_i$, $i=1, 2, 3$ for the first element, the second element and third element such that each integer shift is less than the scaling constant,
   transmitting from the second processor to the first processor the set of encrypted summations, wherein the first processor is configured to decrypt the encrypted summation using a private key, to determine a minimum from the set of encrypted summations, to convert the minimum to binary form, and to encrypt the minimum to produce encrypted bits;
   receiving by the second processor the encrypted bits from the first processor; and
   selecting only relevant bits from the encrypted bits based on the integer shifts $\alpha_i$ and the scaling constant $\mu$.

8. The method of claim 1, wherein the substitution cost is a polynomial function of a symbol from the first sequence and the symbol from the second sequence.

9. The method of claim 1, wherein the substitution cost is an absolute distance between a symbol from the first sequence and the symbol from the second sequence.

10. The method of claim 1, wherein the substitution cost is a constant when a symbol from the first sequence is different from the symbol from the second sequence, and zero when the symbol from the first sequence is identical to the symbol from the second sequence.

11. The method of claim 1, further comprising:
    determining a length of longest common subsequence between the first sequence and the second sequence.

* * * * *